May 30, 1939. M. E. WALSH 2,160,347

DETACHABLE WEED GUARD FOR FISHHOOKS

Filed May 6, 1937

INVENTOR.
MICHAEL E. WALSH
BY M. Talbert Dick
ATTORNEY.

Patented May 30, 1939

2,160,347

UNITED STATES PATENT OFFICE 2,160,347

DETACHABLE WEED GUARD FOR FISHHOOKS

Michael E. Walsh, Chicago, Ill.

Application May 6, 1937, Serial No. 141,105

1 Claim. (Cl. 43—38)

The principal object of my invention is to provide a suitable weed guard that may be easily and quickly attached to or detached from an ordinary fish hook.

A further object of my invention is to provide a detachable weed guard for fish hooks that is light in weight.

A still further object of this invention is to provide a weed guard for fish hooks that is capable of automatically releasing itself from an operative position when the hook is struck by a fish.

A still further object of my invention is to provide a weed guard for fish hooks that may be instantly released from an operative position by the fisherman when desired.

A still further object of this invention is to provide a detachable weed guard for fish hooks that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Weed guards are often used on hooks or lure hook assemblies. Such guards are rigidly fixed to the hook or lure, and are, therefore, difficult to adjust, and are often damaged by the striking fish. I have overcome such objections by providing a weed guard that will snap on the ordinary fish hook, may be easily adjusted or removed, and is not subject to damage by the fish. Also my guard does not interfere with the successful removal of the fish from the hook.

Figure 2:
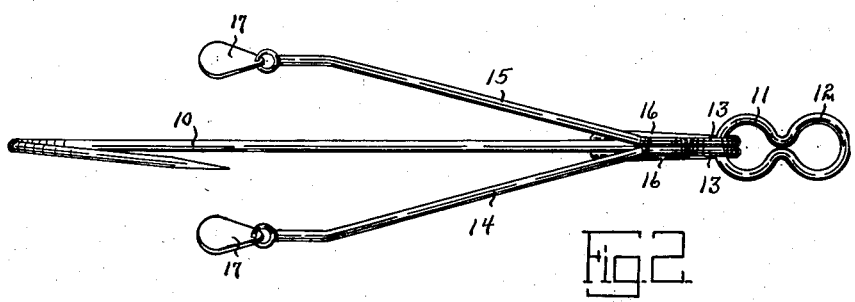
Fig. 2 is a top plan view of my device on a fish hook.

Referring to the drawing, I have used the numeral 10 to designate an ordinary fish hook having the line attaching eyelet 11. Some hooks have an additional eyelet 12 as shown in Fig. 2.

Figure 3:
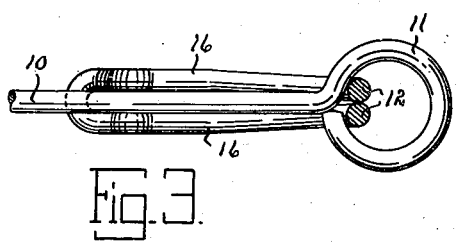
Fig. 3 is an enlarged sectional view of a portion of my guard and a portion of the hook taken on the line 3—3 of Fig. 1.

The numeral 13 designates the loop portion of my guard consisting of a double strand of spring wire. The upper ends of these two strands of wire that rest side by side as shown in Fig. 2 continue rearwardly and upwardly and are spread apart to form the guard arm portions 14 and 15. The lower ends of these two strands also extend rearwardly and upwardly a slight distance, are slightly spread apart and then extend downwardly and rearwardly and then are joined together, thereby forming a hump catch portion 16 as shown in Fig. 3. Obviously, my entire guard may be formed from a single strand of wire; the hump catch portion 16 being first formed in the center of the length of wire.

Figure 1:
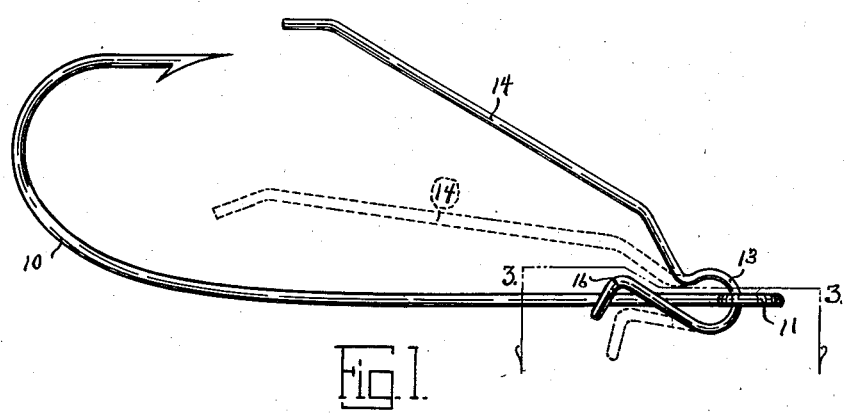
Fig. 1 is a side view of my guard in an operative position on a fish hook with dotted lines showing one of its positions when not in operative position.

To attach my guard, it is merely necessary to thread the hump catch end portion downward through the eyelet 11 of the hook and rotate until the loop portion 13 is inside the eyelet as shown in dotted lines in Fig. 1. To place the guard in an operative position, the hump portion 16 is moved upwardly at each side of the stem of the hook, thereby snapping into frictional engagement on and around each side of the stem of the hook and yieldingly holding the guard arms 14 and 15 in proper position at each side of the spear end of the hook. Obviously, to move the guard to an inoperative position it is merely necessary to push the guard downwardly to move the hump portion out of engagement on the stem of the hook at which moment the guard will be in a free or loose condition on the hook. The striking of a fish may also move the guard to such an inoperative position.

The guard may also be manually rotated transversely of its longitudinal axis to adjust the lateral position of the arms 14 and 15. If desired, only one arm may be used and when this is the case the free end of the arm will be directly adjacent the point of the hook.

The upward movement of the two strand hump portion relative to the stem of the hook is limited by it looping and joining together below the stem. If desired lure elements 17 may be attached at the free ends of the guard arms.

Some changes may be made in the construction and arrangement of my improved detachable weed guard for fish hooks without departing from the real spirit and purpose of my invention, and it is my intention to cover by my claim any modified forms of structure or use of mechanical equivalents which may be reasonably included within its scope.

I claim:

In combination with a fish hook having a stem portion, a spear portion and an eyelet, a weed guard comprising a double strand hump portion, a connection portion connecting the two ends of said double strand hump portion; said double strand hump portion being designed to normally extend at each side of the stem of said hook by frictional contact, a strand loop portion extending from the other end of one of said double strand hump portions and loosely extending through the eyelet of said hook, and an arm portion extending from the upper end of said strand loop portion terminating at a point in the vicinity of said spear portion of said hook.

MICHAEL E. WALSH.